US009458367B2

(12) United States Patent
Siskin et al.

(10) Patent No.: US 9,458,367 B2
(45) Date of Patent: Oct. 4, 2016

(54) LOW TEMPERATURE TRANSPORT AND STORAGE OF AMINE GAS TREATMENT SOLUTIONS

(71) Applicants: Michael Siskin, Westfield, NJ (US); Robert Basil Fedich, Long Valley, NJ (US); Michel Daage, Hellertown, PA (US)

(72) Inventors: Michael Siskin, Westfield, NJ (US); Robert Basil Fedich, Long Valley, NJ (US); Michel Daage, Hellertown, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 382 days.

(21) Appl. No.: 13/793,298

(22) Filed: Mar. 11, 2013

(65) Prior Publication Data

US 2013/0240047 A1   Sep. 19, 2013

Related U.S. Application Data

(60) Provisional application No. 61/610,608, filed on Mar. 14, 2012.

(51) Int. Cl.
*C09K 3/00* (2006.01)
*B01D 53/14* (2006.01)

(52) U.S. Cl.
CPC ............ *C09K 3/00* (2013.01); *B01D 53/1468* (2013.01); *B01D 53/1493* (2013.01); *B01D 2252/103* (2013.01); *B01D 2252/204* (2013.01); *B01D 2252/2023* (2013.01); *B01D 2252/2025* (2013.01); *B01D 2252/504* (2013.01); *B01D 2252/60* (2013.01); *Y10T 137/0391* (2015.04)

(58) Field of Classification Search
CPC ............... F25J 2205/60; F25J 2205/62; F25J 2205/64; F25J 2205/68; F25J 2205/70; B01D 53/145; B01D 53/945; B01J 35/04; F01N 2013/026
USPC .......... 422/177; 423/228, 230, 242.7; 252/69
See application file for complete search history.

(56) References Cited

U.S. PATENT DOCUMENTS

| | | | |
|---|---|---|---|
| 2,360,861 A | 10/1944 | Pierotti et al. | |
| 2,385,704 A | 9/1945 | Hooker et al. | |
| 3,039,251 A | 6/1962 | Kamlet | |
| 3,475,329 A | 10/1969 | Little et al. | |
| 3,826,811 A | 7/1974 | Hakka | |
| 4,112,051 A | 9/1978 | Sartori et al. | |
| 4,150,962 A | 4/1979 | Colton | |
| 4,405,581 A | 9/1983 | Savage et al. | |
| 4,405,583 A | 9/1983 | Stogryn et al. | |
| 4,405,585 A * | 9/1983 | Sartori ............... B01D 53/1493 252/189 |
| 4,471,138 A | 9/1984 | Stogryn | |
| 4,618,481 A | 10/1986 | Heinzelmann et al. | |
| 4,801,308 A | 1/1989 | Keefer | |
| 4,816,121 A | 3/1989 | Keefer | |
| 4,892,674 A | 1/1990 | Ho et al. | |
| 4,894,178 A | 1/1990 | Ho et al. | |
| 4,961,873 A * | 10/1990 | Ho et al. ........................ 252/189 |
| 4,968,329 A | 11/1990 | Keefer | |
| 5,057,296 A | 10/1991 | Beck | |
| 5,082,473 A | 1/1992 | Keefer | |
| 5,098,684 A | 3/1992 | Kresge et al. | |
| 5,102,643 A | 4/1992 | Kresge et al. | |
| 5,108,725 A | 4/1992 | Beck et al. | |
| 5,256,172 A | 10/1993 | Keefer | |
| 5,958,368 A | 9/1999 | Ryoo et al. | |
| 6,051,050 A | 4/2000 | Keefer et al. | |
| 6,063,161 A | 5/2000 | Keefer et al. | |
| 6,406,523 B1 | 6/2002 | Conner et al. | |
| 6,629,525 B2 | 10/2003 | Hill et al. | |
| 6,651,658 B1 | 11/2003 | Hill et al. | |
| 6,691,702 B2 | 2/2004 | Appel et al. | |
| 7,645,324 B2 | 1/2010 | Rode et al. | |
| 8,486,183 B2 | 7/2013 | Siskin et al. | |
| 2002/0139717 A1 | 10/2002 | Titley et al. | |
| 2005/0109210 A1* | 5/2005 | Davis ........................ A61L 9/01 95/235 |
| 2006/0048648 A1 | 3/2006 | Gibbs et al. | |
| 2006/0169142 A1 | 8/2006 | Rode et al. | |
| 2008/0282884 A1 | 11/2008 | Kelley et al. | |
| 2009/0308248 A1 | 12/2009 | Siskin et al. | |
| 2010/0037775 A1 | 2/2010 | Siskin et al. | |

FOREIGN PATENT DOCUMENTS

| | | |
|---|---|---|
| CN | 1421264 A | 6/2003 |
| EP | 0537593 A1 | 10/1992 |

(Continued)

OTHER PUBLICATIONS

PCT International Search Report issued in corresponding PCT Application No. PCT/US2013/030790 on Jun. 6, 2013.

(Continued)

*Primary Examiner* — Frantz Jules
*Assistant Examiner* — Brian King
(74) *Attorney, Agent, or Firm* — Glenn T. Barrett; Andrew T. Ward

(57) ABSTRACT

A liquid aminoether acid gas absorbent which is subject to freezing in a cold climatic zone though which the aminoether is to be shipped is rendered freeze-resistant by mixing the aminoether with water prior to transport through the cold climatic zone; the aminoether/water mixture typically contains 10 to 40 weight percent water, based on the weight of the aminoether. The aminoether/water mixture can also be stored in the cold climatic zone without being externally maintained at a temperature above the inherent freezing point of the aminoether.

19 Claims, No Drawings

(56) References Cited

FOREIGN PATENT DOCUMENTS

| GB | 2017524 A | 10/1979 |
|---|---|---|
| WO | 9832519 A1 | 7/1998 |
| WO | 03055578 A1 | 7/2003 |
| WO | 2005032694 A1 | 4/2005 |
| WO | 2005070518 A1 | 8/2005 |
| WO | 2006017940 A1 | 2/2006 |
| WO | 2006074343 A2 | 7/2006 |
| WO | 2007135100 A1 | 11/2007 |

OTHER PUBLICATIONS

PCT Written Opinion issued in corresponding PCT Application No. PCT/US2013/030790 on Jun. 6, 2013.

Kohl et al., "Gas Purification", Fifth Edition, Gulf Publishing Company (1997), pp. 199-205, 223-224 and 359-362, ISBN-13:978-0-88415-220-0.

Frazier et al., "Selective Absorption of Hydrogen Sulfide With Gas Streams", Industrial and Engineering Chemistry, No. 42, pp. 2288-2292 (1950).

Savage et al., "Chemical Absorption and Desorption of Carbon Dioxide From Hot Carbonate Solutions", Chemical Engineering Science, No. 35, p. 1513 (1980).

Garner et al., "The Selective Absorption of Hydrogen Sulphide in Carbonate Solutions", Journal of Applied Chemistry, vol. 8, Issue 5, pp. 325-336, May 1958.

Hohlfeld, R.W., New H2S Scrubber Cleans Small or Large Gas Streams, Oil Gas Journal, vol. 77, pp. 129-130, Oct. 1979.

Kent et al., "Selective H2S Caustic Scrubber", Proceedings of Gas Conditioning Conference, University of Oklahoma (Jan. 1985).

Chowdhury et al., "Synthesis and Selection of Hindered New Amine Absorbents for CO2 Capture", Energy Procedia, No. 4, pp. 201-208 (2011).

Allen et al., Hydrolysis of N-Methyl-2,4,4-substituted Δ2-Oxazolinium Iodides, Journal of Organic Chemistry, No. 28, p. 2759 (1963).

Kresge et al., "The Discovery of ExxonMobil's M41S Family of Mesoporous Molecular Sieves", Studies in Surface Science and Catalysts, No. 148, Ed. Terasaki, Elsevier bV (2004).

Zhao et al., "Triblock Copolymer Syntheses of Mesoporous Silica with Periodic 50 to 300 Angstrom Pores", Science, No. 279, pp. 548-552(1998).

Zamani et al., "Mesoporous Silica: A Suitable Adsorbent for Amines", KIT-6 Nanoscale Research Letters, vol. 4, No. 11, pp. 1303-1308 (Nov. 2009).

Huang et al., "Amine-Grafted MCM-48 and Silica Xerogel as Superior Sorbents for Acidic Gas Removal From Natural Gas", Industrial and Engineering Chemistry Research, vol. 42, No. 12, pp. 2427-2433 (2003).

Lunsford et al., "Optimization of Amine Sweetening Units", Proceedings 1996 AlChe Spring National Meeting, New York, NY.

DeTar, "Effects of Alkyl Groups on Rates of Sn2 Reactions", Journal of Organic Chemistry, vol. 45, pp. 5174-5176 (1980).

Benson et al., "N-Alkyl-5,5-dimethyl-2-oxomorpholin-3-yl radicals. Characterization and Reaction With Molecular Oxygen", Journal American Chemical Society, vol. 113. pp. 8879-8886 (1991).

Maddox et al., "Reactions of Carbon Dioxide and Hydrogen Sulfide With Some Alkanolamines", Ind. Eng. Chem. Res. vol. 26, pp. 27-31 (1987).

* cited by examiner

LOW TEMPERATURE TRANSPORT AND STORAGE OF AMINE GAS TREATMENT SOLUTIONS

CROSS-REFERENCE TO RELATED APPLICATIONS

This application claims priority benefit under 35 USC 120 from U.S. patent application Ser. No. 61/610,608, filed 14 Mar. 2012.

FIELD OF THE INVENTION

The present invention relates to the absorption of acidic gases from a mixed gas streams containing acidic and non-acidic components.

BACKGROUND OF THE INVENTION

The treatment of gases and liquids containing acidic gases such as $CO_2$, $H_2S$, $CS_2$, HCN, COS and sulfur derivatives of $C_1$ to $C_4$ hydrocarbons with amine solutions to remove these acidic gases is well established. The amine usually contacts the acidic gases and the liquids as an aqueous solution containing the amine in an absorber tower with the aqueous amine solution passing in countercurrent to the acidic fluid. In typical cases using common amine sorbents such as monoethanolamine (MEA), diethanolamine (DEA), methyldiethanolamine (MDEA), diisopropylamine (DIPA), or hydroxyethoxyethylamine (DGA). The liquid amine stream contained the sorbed acid gas is typically regenerated by desorption of the sorbed gases in a separate tower with the regenerated amine and the desorbed gases leaving the tower as separate streams. The various gas purification processes which are available are described, for example, in *Gas Purification*, Fifth Ed., Kohl and Neilsen, Gulf Publishing Company, 1997, ISBN-13: 978-0-88415-220-0.

The treatment of acid gas mixtures containing $CO_2$ and $H_2S$ with amine solutions typically results in the simultaneous removal of substantial amounts of both the $CO_2$ and $H_2S$. It is often desirable, however, to treat acid gas mixtures containing both $CO_2$ and $H_2S$ so as to remove the $H_2S$ selectively from the mixture, thereby minimizing removal of the $CO_2$. Selective removal of $H_2S$ results in a relatively high $H_2S$ /$CO_2$ ratio in the separated acid gas which simplifies the conversion of $H_2S$ to elemental sulfur using the Claus process. Selective $H_2S$ removal is applicable to a number of gas treating operations including treatment of hydrocarbon gases from oil sands, coal and shale pyrolysis, refinery gas and natural gas having a low $H_2S$ /$CO_2$ ratio and is particularly desirable in the treatment of gases wherein the partial pressure of $H_2S$ is relatively low compared to that of $CO_2$ because the capacity of an amine to absorb $H_2S$ from the latter type gases is very low. Examples of gases with relatively low partial pressures of $H_2S$ include synthetic gases made by coal gasification, sulfur plant tail gas and low-Joule fuel gases encountered in refineries where heavy residual oil is being thermally converted to lower molecular weight liquids and gases.

Although primary and secondary amines such as MEA, DEA, DPA, and DGA absorb both $H_2S$ and $CO_2$ gas, they have not proven especially satisfactory for preferential absorption of $H_2S$ to the exclusion of $CO_2$ because in aqueous solution, the amines undergo more selective reaction with $CO_2$ to form carbamates. The tertiary amine, MDEA, has been reported to have a high degree of selectivity toward $H_2S$ absorption over $CO_2$ (Frazier and Kohl, Ind. and Eng. Chem., 42, 2288 (1950)), but its commercial utility is limited because of its restricted capacity for $H_2S$ loading and its limited ability to reduce the $CO_2$ content of the gas. Similarly, diisopropylamine (DIPA) is relatively unique among secondary amino alcohols in that its use has been reported, alone or with a physical solvent such as sulfolane, for selective removal of $H_2S$ from gases containing $H_2S$ and $CO_2$.

U.K. Patent Publication No. 2,017,524-A (Shell) disclosed that aqueous solutions of dialkylmonoalkanolamines, and particularly N,N-diethyl-monoethanolamine (DEAE), have higher selectivity and capacity for $H_2S$ removal at higher loading levels than MDEA solutions. Nevertheless, even DEAE is not very effective for the low $H_2S$ loading frequently encountered in the industry. Also, DEAE has a boiling point of 161° C., and as such, it is characterized as being a low-boiling, relatively highly volatile amino alcohol. Such high volatilities under most gas scrubbing conditions result in large material losses with consequent losses in economic advantages.

A number of severely sterically hindered amino ether compounds, notably amino ether alcohols, diamino ethers and alkoxy amino ether alcohols have been developed for the selective removal of $H_2S$ in the presence of $CO_2$. U.S. Pat. Nos. 4,405,581; 4,405,583; 4,405,585, 4,471,138 and 4,894,178 and U.S. Patent Publication 2010/0037775 disclose these highly effective hindered amino ethers, their synthesis and use in selective gas separation processes. Specific amino ethers described in these patents include BTEE (bis (tert.-butylamino-ethoxy)-ethane synthesized from tertiary-butylamine and bis-(2-chloroethoxy)-ethane as well as EEETB (ethoxyethoxyethanol-tert-butylamine, synthesized from tert-butylamine and chloroethoxy-ethoxyethanol). U.S. Pat. No. 4,894,178 indicates that a mixture of BTEE and EEETB is particularly effective for the selective separation of $H_2S$ from $CO_2$. U.S. 2010/0037775 describes the preparation of alkoxy-substituted etheramines as selective sorbents for separating $H_2S$ from $CO_2$ Compared to aqueous MDEA, these severely sterically hindered amines lead to much higher selectivity at high $H_2S$ loadings A significant problem arises with some of these absorbent materials during their transport from the manufacturing site to the location of use in cold climates; this problem arises when the pour point of the material is relatively high, typically at least −20° C. and the climatic conditions at their location of use is below that value or close to it. Such climatic zones include, for example, the North Sea areas of the UK and Norway, Ft. McMurray in Alberta, Canada and Billings, Mont. In zones such as these, there is the danger that the liquid will freeze solid or become unpourable to the extent that it cannot be readily or conveniently transferred or used unless they are thawed, but this takes time and provision needs be made for warmed defrosting and storage facilities, especially on offshore platforms where space may be very limited. It would therefore be desirable to transport the sorbents without having them solidify under the temperatures likely to be encountered during shipping from on location to another.

SUMMARY OF THE INVENTION

We have now found that liquid aminoether sorbents of high pour point can be transported in cold climatic conditions without significant danger of freezing by the addition of water in judicious amounts. While both the aminoethes themselves and the water would freeze under those same conditions, mixtures of the two are resistant to freezing.

While other pour point depressants could be expected to be effective also, the use of water is particularly attractive since the amines are typically used in the form of an aqueous solution; shipping with the added water therefore enables the use of additives which might interfere with the processing to be avoided. In addition, the use of water is economical and avoids the use of possibly expensive chemicals. In offshore locations, the addition of the water prior to shipping also reduces the amount of water needed to be added at the site of use offshore where fresh water supplied may be limited.

According to the present invention, therefore, a liquid, severely sterically hindered, aminoether acid gas absorbent which is subject to freezing in a cold climatic zone by reason of a pour point (ASTM D-97 or equivalent, e.g. Autopour), of −20° C. or higher, is rendered freeze-resistant by mixing the aminoether with water prior; the aminoether/water mixture typically contains 10 to 80 more typically 10 to 50, weight percent water, based on the weight of the aminoether although the exact proportions can be adjusted according to the absorbent itself and the projected temperatures during transport, storage and use. The amount of water necessary may be as low as 10 or 20 percent for a useful lowering of the pour point. The aminoether/water mixture can transported through or into cold climatic zones with reduced risk of freezing and can be stored there without being maintained at a temperature above the freezing point of the aminoether. The treated aminoether absorbents in the form of the aqueous mixture can therefore be transported from a first location to a second location in a cold climatic zone for use in an acid gas treatment process with increased convenience.

In typical cases, the aminoether/water mixture will be transported from a first, relatively warmer climatic zone which has an ambient temperature at which the aminoether remains unfrozen to a second climatic zone, colder relative to the first zone, which has an ambient temperature below the freezing point of the aminoether itself; the concentration of water in the aminoether/water mixture is adjusted to be sufficient to depress the freezing point of the mixture to a temperature below the ambient temperature of the second climatic zone. The aminoether/water mixture can stored at a location in the second climatic zone at a temperature below the freezing point of the aminoether itself, e.g. in an unheated warehouse.

DETAILED DESCRIPTION

Aminoether Absorbents

While the proposed transport scheme is applicable to the broad class of liquid amines which may be used for the absorption of acidic gases such as $H_2S$ and CO2 from gas streams such a natural gas, syn gas etc, the preferred amine sorbents are those which may be used for the selective sorption of $H_2S$ from acidic gas streams which are mixtures of $H_2S$ with $CO_2$ and other acidic gases such as $CS_2$, HCN, COS and sulfur derivatives of $C_1$ to $C_4$ hydrocarbons. This preferred class of aminoethers is represented by the derivatives of diethylene glycol or polyethylene glycols which contain severely sterically hindered amino groups as well as by their corresponding derivatives derivatized on the alcohol group to form the corresponding ether or ester derivatives and their corresponding sulfonate and phosphonate salts. In general, the preferred severely sterically hindered aminoether derivatives will have a cumulative Es (Taft steric hindrance constant) value greater than 1.75 (see below for further explanation of this constant and its calculation).

Preferred examples of these aminoethers are disclosed in U.S. Pat. Nos. 4,405,583; 4,405,585; 4,471,138; 4,894,178 and U.S. Patent Publication 2010/0037775, to which reference is made for a full description of these materials, their synthesis and their use in selective acidic gas separation processes. Their disclosures are summarized below for convenience.

U.S. Pat. No. 4,405,583: The hindered diamino ethers disclosed in this patent are defined by the formula:

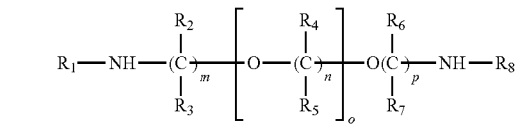

where $R^1$ and $R^8$ are each $C_1$ to $C_8$ alkyl and $C_2$ to $C_8$ hydroxyalkyl groups, $R^2$, $R^3$, $R^4$, $R^5$, $R^6$, and $R^7$ are each hydrogen, $C_1$-$C_4$ alkyl and hydroxyalkyl groups, with certain provisos to define the adequately hindered molecule and m, n, and p are integers from 2 to 4 and o is zero or an integer from 1 to 10. A typical diamino ether of this type is 1,2-bis(tert-butylaminoethoxy) ethane, a diamino derivative of triethylene glycol.

U.S. Pat. No. 4,405,585: The hindered amino ether alcohols disclosed in this patent are defined by the formula:

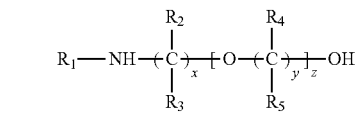

where $R^1$ is $C_1$-$C_8$ primary alkyl and primary $C_2$-$C_8$ hydroxyalkyl, $C_3$-$C_8$ branched chain alkyl and branched chain hydroxyalkyl and $C_3$-$C_8$ cycloalkyl and hydroxycycloalkyl, $R^2$, $R^3$, $R^4$ and $R^5$ are each hydrogen, $C_1$-$C_4$ alkyl and $C_1$-$C_4$ hydroxyalkyl radicals, with the proviso that when R1 is a primary alkyl or hydroxyalkyl radical, both $R^2$ and $R^3$ bonded to the carbon atom directly bonded to the nitrogen atom are alkyl or hydroxyalkyl radicals and that when the carbon atom of $R^1$ directly bonded to the nitrogen atom is secondary at least one of $R^2$ or $R^3$ bonded to the carbon atom directly bonded to the nitrogen atom is an alkyl or hydroxyalkyl radical, x and y are each positive integers from 2 to 4 and z is an integer from 1 to 4. Exempalry compounds of this type include the amino ether alcohol tert-butylaminoethoxyethanol, a derivative of diethylene glycol.

U.S. Pat. No. 4,471,138: This patent discloses the desirability of using a combination of a diamino ether with an aminoether alcohol. The two compounds are represented by the respective formulae:

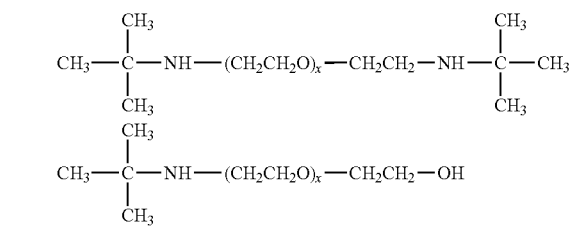

where x is an integer ranging from 2 to 6. This mixture can be prepared in the novel one-step synthesis, by the catalytic tertiary butylamination of a polyalkenyl ether glycol, HO—

($CH_2CH_2O)_x$—$CH_2CH_2$—OH, or halo alkoxyalkanol. For example, a mixture of bis-(tert-butylaminoethoxy)ethane (BTEE) and ethoxyethoxyethanol-tert-butylamine (EEETB) can be obtained by the catalytic tert-butylamination of triethylene glycol. The severely hindered amine mixture, e.g., BTEE/EEETB, in aqueous solution can be used for the selective removal of $H_2S$ in the presence of $CO_2$ and for the removal of $H_2S$ from gaseous streams in which $H_2S$ is the only acidic component, as is often the case in refineries.

U.S. Pat. No. 4,894,178: A specific combination of diamino ether and aminoalcohol represented by the respective formulae:

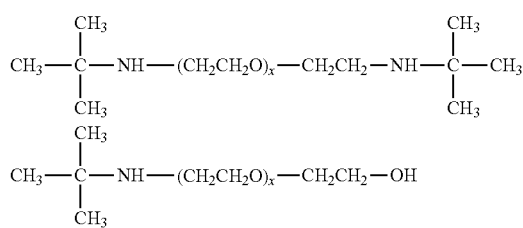

with x being an integer ranging from 2 to 6 and the weight ratio of the first amine to the second amine ranging from 0.23:1 to 2.3:1 and preferably 0.43 to 2.3:1. This mixture can be prepared in the one-step synthesis, by the catalytic tert-butylamination of the corresponding polyalkenyl ether glycol, for example, by the catalytic tert-butylamination of triethylene glycol. This mixture is one of the preferred absorbents for use in offshore gas processing.

US 2010/0037775: The reaction of a polyalkenyl ether glycol with a hindered amine such as tert-butylamine to form useful aminother absorbents is improved by the use of an alkoxy-capped glycol in order to preclude the formation of an unwanted cyclic by-product, tert-butyl morpholine (TBM). A preferred capped glycol is methoxy-triethylene glycol although the ethoxy-, propoxy- and butoxy homologs may also be used. The reaction between triethylene glycol and tert-butylamine is shown to produce a mixture of bis-(tert-butylaminoethoxy) ethane and tert-butylaminoethoxyethoxyethanol in a weight ratio of about 65-67%: 33% for a total yield of about 95% of the mixture over an extended reaction time while the reaction with the alkoxy-capped glycol produces the mono-amino reaction product in comparable yield after a significantly shorter reaction time.

The aminoether compounds may be used in conjunction with other related materials such as an amine salt as described in U.S. Pat. No. 4,618,481. The severely sterically hindered amino compound can be a secondary amino ether alcohol or a disecondary amino ether. The amine salt can be the reaction product of the severely sterically hindered amino compound, a tertiary amino compound such as a tertiary alkanolamine or a triethanolamine, with a strong acid, or a thermally decomposable salt of a strong acid, i.e., ammonium salt or a component capable of forming a strong acid.

Similarly, U.S. Pat. No. 4,892,674 discloses a process for the selective removal of $H_2S$ from gaseous streams using an absorbent composition comprising a non-hindered amine and an additive of a severely-hindered amine salt and/or a severely-hindered aminoacid. The amine salt is the reaction product of an alkaline severely hindered amino compound and a strong acid or a thermally decomposable salt of a strong acid, i.e., ammonium salt.

A preferred class of aminoethers for offshore application is defined by the formula:

where $R^1$ is a secondary or tertiary alkyl group of 3 to 8 carbon atoms, preferably a tertiary group of 4 to 8 carbon atoms, Y is H or alkyl of 1 to 6 carbon atoms, n is a positive integer from 3 to 8 and x is a positive integer from 3 to 6. The preferred $R^1$ group is tertiary butyl and the most preferred amino ethers are those derived from triethylene glycol (n is 2, x is 3). When Y is H, the amino ether is an amino ether alcohol such as tert-butylamino ethoxyethoxyethanol, derived from triethylene glycol; when Y is alkyl, preferably methyl, the amino ether is an alkoxy amino ether, with preference for tert-butylamino methoxy-ethoxyethoxyethanol. The monoamino ethers may be used in blends with diamino ethers in which the terminal OH group of the ether alcohol or the terminal alkoxy group of the alkoxy amino ether is replaced by a further hindered amino group as expressed in the formula:

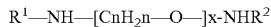

where $R^1$, n and x are as defined above and $R^2$, which may the same or different to $R^1$, is a secondary or tertiary alkyl group of 3 to 8 carbon atoms. A preferred diamino ether of this type is bis-(t-butylamino ethoxy) ethane which may conveniently be used as a mixture with tert-butylamino methoxy-ethoxyethoxyethanol in a weight ratio of about 65-67wt%: 33-35wt%.

The severely sterically hindered secondary aminoether mentioned above are characterized by acyclic or cyclic moieties attached to the amino nitrogen atom(s). The term "severely sterically hindered" signifies that the nitrogen atom of the amino moiety is attached to one or more bulky carbon groupings. Typically, the severely sterically hindered aminoether alcohols have a degree of steric hindrance such that the cumulative $E_s$ value (Taft's steric hindrance constant) greater than 1.75 as calculated from the values given for primary amines in Table V in D. F. DeTar, *Journal of Organic Chemistry*, 45, 5174 (1980), to which reference is made for a description of this parameter.

Another means for determining whether a secondary amino compound is "severely sterically hindered" is by measuring its 15N nuclear magnetic resonance (NMR) chemical shift. It has been found that the sterically hindered secondary amino compounds have a 15N NMR chemical shift greater than about δ+40 ppm, when a 90% by wt. amine solution in 10% by wt. $D_2O$ at 35° C. is measured by a spectrometer using liquid (neat) ammonia at 25° C. as a zero reference value. Under these conditions, the tertiary amino compound used for comparison, methyldiethanolamine, has a measured 15N NMR chemical shift value of δ27.4. For example, 2-(2-tertiarybutylamino) propoxyethanol, 3-(tertiarybutylamino)-1-propanol, 2-(2-isopropylamino)-propoxyethanol and tertiarybutylaminoethoxyethanol had measured 15N NMR chemical shift values of δ+74.3, δ+65.9, δ+65.7 and δ+60.5 ppm, respectively, whereas the ordinary sterically hindered amine, secondary-butylaminoethoxyethanol and the non-sterically hindered amine, n-butylaminoethoxyethanol had measured 15N NMR chemical shift values of δ+48.9 and δ35.8 ppm, respectively. When the cumulative $E_s$ values is plotted against the 15N NMR chemical shift values of the amino compounds mentioned above, a straight line is observed. Amino compounds having an 15N NMR chemical shift values greater than δ+50 ppm under these test conditions had a higher $H_2S$ selectively than those amino compounds having an 15N NMR chemical shift less than δ+50 ppm.

The sterically hindered aminoether absorbents which require special attention during cold storage, transport and use are those which have a Pour Point (ASTM D-97 or equivalent) of –20° C. or higher. Absorbents with lower pour points generally present no problem and accordingly it is not normally considered necessary for them to be mixed with water before shipping out from the manufacturing location. Mixtures of aminoether absorbents may require treatment with water if their freeze points vary below those of the individual components of the mixtures having adequately low freeze/pour points.

Aminoether Blending, Transport, Storage

The aminoether absorbent or mixture of aminoether absorbents is blended with water to confer the desired resistance to freezing during shipping and storage. While the use of other suitable pour point depressants would be similarly effective, the use of water is particularly attractive since the amines are typically used in the form of an aqueous solution; shipping with the added water therefore avoids the use of other possibly expensive additives.

Exemplary freezing points for $H_2S$ selective hindered aminoether absorbents are:

| Absorbent | Pour Point (° F./° C.) |
|---|---|
| MEEETB (1) | <–75/<–59 |
| BisTEGTB (2) | –60/–51 |
| TEG, 7.3 wt %; TEGTB, 57.9 wt %; Bis-TEGTB, 34.9 wt %. | –20/–29 |
| EETB 95 wt % (3) | –15/–26 |

Notes:
1. Methoxy ethoxyethoxyethanol-t-butylamine (MEEETB) 97.8% purity, with methoxy-triethylene glycol (TEGM), 2.2 wt. %.
2. Bis(t-butylamino) triethylene glycol (BisTEGTB) 91.6 wt % purity, with triethylene glycol (TEG) 0.5 wt %; triethylene glycol-t-butylamine (TEGTB) 5.75 wt %.
3. Ethoxyethanol-t-butylamine.

While the freezing points of the BisTEGTB and MEEETB are low enough that no problems are normally to be expected in the terrestrial environment, EETB and the blend of aminoethers have a pour/freezing point high enough that they can be expected to freeze in normal winter conditions in the higher latitudes. By adding water, however, the freezing point can be lowered to a useful extent, facilitating transport and storage in climates with a harsh climate as shown by the following data recording the pour points achieved by adding water to these materials:

| Absorbent | Concn. (wt %) in water | Pour Point, ° F./° C. |
|---|---|---|
| TEG, 7.3 wt %; TEGTB, 57.9 wt %; Bis-TEGTB, 34.9 wt %. | 80 | –30/–34 |
| TEG, 7.3 wt %; TEGTB, 57.9 wt %; Bis-TEGTB, 34.9 wt %. | 60 | –45/–43 |
| EETB 95 wt % | 80 | –30/–34 |
| EETB 95 wt % | 60 | –35/–37 |

The water, in an amount from about 10-50, preferably 20-40, weight percent, based on the weight of the amine, is simply blended into the liquid aminoether using conventional mixing techniques, e.g., stirred tank mixer. The blended water/aminoether is then readied for shipping, for example, by loading into 200-l drums, ISO liquid containers, bulk liquid containers, Flexitanks, road tank trucks, rail tank cars, etc. The blended liquid is then shipped to the cold climatic location using conventional means without the need for maintaining it at temperatures above freezing. Upon arrival at the cold climatic location, the aminoether/water blend can be diluted if necessary to the final desired concentration, typically from 5 to 30 v/v percent, and used in the absorption process. Alternatively, it can be stored in an unheated location until wanted for use.

The present transport scheme is useful when the aminoether is to be shipped through a climatic zone where sub-freezing temperatures for the aminoether, typically below about 0° C., prevail. It is especially useful when shipping through a zone where the temperature is expected to be more than ~10° C. below the freezing temperature of the aminoether, especially when temperatures more than ~20° C. below the freezing point of the aminoether are expected.

The amount of water required to confer resistance to freezing will depend upon the identity of the aminoether. As noted above, 10 to 45 wt. percent is normally sufficient with amounts within this range varying according to the undiluted freezing point of the aminoether

The invention claimed is:

1. A method for transporting a liquid aminoether acid gas absorbent having a pour point not lower than –20° F. for use in an acid gas treatment process through a first and second climatic zone, wherein the aminoether absorbent is transported as a mixture, said mixture consisting essentially of the aminoether absorbent and water, wherein the aminoether absorbent is mixed with water prior to being transported through the second climatic zone to form an aminoether/water mixture with about 10 to 40 weight percent water, based on the weight of the aminoether; wherein the aminoether/water mixture is transported from the first climatic zone to the second climatic zone, the first climatic zone being warmer relative to the second climatic zone, the first climatic zone having an ambient temperature at which the aminoether remains unfrozen, the second climatic zone having an ambient temperature below the freezing point of the aminoether itself and water itself, the concentration of water in the aminoether/water mixture being sufficient to depress the freezing point of the mixture to a temperature below the ambient temperature of the second climatic zone; wherein the first climatic zone and the second climatic zone are in different geographic locations.

2. A method according to claim 1 in which the aminoether/water mixture is stored at a location in the second climatic zone at a temperature below the freezing point of the aminoether itself.

3. A method according to claim 1 in which the aminoether comprises a diethylene glycol derivative or triethylene glycol derivative containing a severely hindered amino group and having an Es value (Taft) of at least 1.75.

4. A method according to claim 1 in which the aminoether comprises tertiary-alkylamino diethylene glycol or a tertiary-alkylamino triethylene glycol.

5. A method according to claim 4 in which the aminoether comprises a mono-tertiary-alkylamino diethylene glycol, a mono-tertiary-alkylamino triethylene glycol, a bis-(tertiary-alkylamino) diethylene glycol or a bis-tertiary-alkylamino triethylene glycol.

6. A method according to claim 5 in which the tertiary alkylamino group comprises a tertiary-butylamino group.

7. A method according to claim 5 in which the aminoether comprises a mixture of bis-(tertiarybutylaminoethoxy)-ethane (BTEE) and ethoxyethoxyethanol-tertiary-butylamine (EEETB).

8. A method according to claim 5 in which the aminoether comprises a mixture in which the weight ratio of the diamino compound to the monoamino in the mixture is from 0.23:1 to 2.3:1.

9. A method according to claim 1 in which the aminoether comprises a alkoxy-tert-alkylamino-ether.

10. A method for storing a liquid aminoether acid gas absorbent for use in an acid gas treatment process in a cold climatic zone having an ambient temperature below the freezing point of the aminoether itself and water itself, wherein the aminoether adsorbent is stored as a mixture, said mixture consisting essentially of the aminoether adsorbent and water, wherein the aminoether absorbent is mixed with water prior to storage in the cold climatic zone to form an aminoether/water mixture with about 10 to 45 weight percent water, based on the weight of the aminoether; the concentration of water in the aminoether/water mixture being sufficient to depress the freezing point of the mixture to a temperature below the ambient temperature of the cold climatic zone.

11. A method according to claim 10 in which the aminoether/water mixture is transported from a first, relatively warmer climatic zone to the cold climatic zone, the first climatic zone having an ambient temperature at which the aminoether remains unfrozen, the concentration of water in the aminoether/water mixture being sufficient to depress the freezing point of the mixture to a temperature below the ambient temperature of the cold climatic zone; wherein the first, relatively warmer climatic zone is in a different geographic location than the cold climatic zone.

12. A method according to claim 11 in which the aminoether/water mixture is transported from the first climatic zone to the location in the cold climatic zone at a temperature below the freezing point of the aminoether itself.

13. A method according to claim 10 in which the aminoether comprises an ethylene glycol or polyethylene glycol compound containing a severely hindered amino group having an Es value (Taft) of at least 1.75.

14. A method according to claim 10 in which the aminoether comprises tertiary-alkylamino diethylene glycol or a tertiary-alkylamino triethylene glycol.

15. A method according to claim 14 in which the aminoether comprises a mono-tertiary-alkylamino diethylene glycol, a mono-tertiary-alkylamino triethylene glycol, a di-tertiary-alkylamino diethylene glycol or a di-tertiary-alkylamino triethylene glycol.

16. A method according to claim 15 in which the tertiary alkylamino group comprises a tertiary-butylamino group.

17. A method according to claim 15 in which the aminoether comprises a mixture of bis-(tertiarybutylaminoethoxy)-ethane (BTEE) and ethoxyethoxyethanol-tertiarybutylamine (EEETB).

18. A method according to claim 15 in which the aminoether comprises a mixture in which the weight ratio of the diamino compound to the monoamino is from 0.23:1 to 2.3:1.

19. A method according to claim 11 in which the aminoether comprises an alkoxy-tert-alkylamino-ether.

* * * * *